United States Patent [19]

Meystre et al.

[11] 4,106,824
[45] Aug. 15, 1978

[54] HYDROSTATIC SUPPORTING DEVICE

[75] Inventors: Noel Meystre, Meilen; Alfred Christ, Zurich; Helmut Miller, Niederrhrodorf, all of Switzerland

[73] Assignee: Escher Wyss Limited, Zurich, Switzerland

[21] Appl. No.: 744,252

[22] Filed: Nov. 23, 1976

[30] Foreign Application Priority Data

Dec. 2, 1975 [CH] Switzerland ............... 15607/75

[51] Int. Cl.² ............................................. F16C 32/06
[52] U.S. Cl. ........................................... 308/9; 308/73
[58] Field of Search ................ 308/5 R, 9, 35, 72, 308/73, 122, DIG. 1; 184/5; 29/113 AD, 116 AD

[56] References Cited

U.S. PATENT DOCUMENTS

| 3,658,393 | 4/1972 | Luthi | 308/9 |
|---|---|---|---|
| 3,791,703 | 2/1974 | Ifield | 308/9 |
| 3,799,628 | 3/1974 | Hakkenberg et al. | 308/9 |
| 3,802,044 | 4/1974 | Spillmann et al. | 29/116 AD |
| 3,994,367 | 11/1976 | Christ | 308/9 |

FOREIGN PATENT DOCUMENTS 2,203,381  8/1973  Fed. Rep. of Germany ............ 308/9

*Primary Examiner*—Trygve M. Blix
*Assistant Examiner*—Charles E. Frankfort
*Attorney, Agent, or Firm*—Robert A. Ostmann

[57] ABSTRACT

Hydrostatic supporting apparatus which supports, without physical contact, a mobile part which moves relatively to a load-bearing part. The apparatus comprises a supporting piston which has at least one hydrostatic bearing pocket which provides a pressure cushion through which the mobile part is supported, and which is urged toward the mobile part by a controlled pressure which increases and decreases, respectively, as the piston moves toward and away from the load-bearing part. Preferably, pressure control is effected by a throttle valve interposed either in a supply path leading from a source of pressure medium to the pressure chamber of a hydraulic supporting motor, or in a feed passage leading from that pressure chamber to the bearing pocket. The pressure cushion of the supporting piston may act directly upon the mobile part, or it may carry an auxiliary hydrostatic supporting element which has its own supply of pressure medium and provides a second pressure cushion which actually supports the mobile part. The apparatus may also include a safety device which serves to maintain supporting pressure for the piston upon failure of the main pressurizing circuit.

13 Claims, 7 Drawing Figures

HYDROSTATIC SUPPORTING DEVICE

BACKGROUND OF THE INVENTION

This invention relates to hydrostatic supporting apparatus which supports, without physical contact, a mobile part which moves relatively to a load-bearing part.

Hydrostatic supporting devices in various forms are already known. One type is the so-called fixed bearing arrangement, wherein hydraulic fluid is supplied in a throttled manner and at a constant rate to a bearing pocket, or several such pockets, in a non-displaceable portion of the load-bearing part. The pressure in the pocket or pockets is influenced to such a great extent by the spacing between the mobile and load-bearing parts that the force vs. travel diagram for these devices resembles a vertical line. Therefore, if the mobile part moves slightly away from the loadbearing part, the device will cease to provide any substantial support.

Another type of known hydrostatic supporting device is the so-called follow-up arrangement. This kind of apparatus differs from the first type in that hydraulic fluid is supplied to the pocket or pockets at a constant pressure, rather than a constant rate. As a result, the force vs. travel diagram for these devices is a horizontal line, i.e., they afford a constant supporting force regardless of displacement of the mobile part.

In a third type of hydrostatic supporting device proposed in the prior art, the bearing pocket or pockets are formed in a displaceable piston which is urged toward the mobile part by the pressure in the chamber of an associated hydraulic supporting motor. Each bearing pocket is connected with the motor chamber via a throttled passage, and the supporting piston is provided with an elastic element which also urges it in the direction of the mobile part. The force vs. travel characteristic of this type of device is an inclined straight line, i.e., the supporting force increases and decreases, respectively, as the mobile part moves toward and away from the load-bearing part. However, the elastic element sometimes is heavy and can be adjusted only by applying considerable force.

SUMMARY OF THE INVENTION

The object of this invention is to provide an improved hydrostatic supporting device employing a displaceable supporting piston which eliminates the need for the elastic element mentioned above, and which makes relatively easy the task of satisfying the force-travel requirements of particular applications. According to the invention, the new supporting apparatus includes hydraulic control means which responds to the position of the supporting piston relative to the load-bearing part and which increases and decreases the pressure in the chamber of the associated hydraulic supporting motor as that piston moves toward and away from the load-bearing part, respectively. In the preferred embodiments, the control means includes a throttle valve having cooperating ported and control members, one of which is carried on the supporting piston and the other of which is carried on the load-bearing part. The location of that valve and the relationship between its throttling action and movement of the supporting piston depend upon the manner in which pressurized medium is delivered to the pressure chamber of the supporting motor. In cases where that chamber is supplied with fluid at a constant pressure, the throttle valve is interposed in the supply path to the chamber, and the throttling effect decreases and increases, respectively, as the supporting piston moves toward and away from the load-bearing part. On the other hand, if the chamber is supplied with fluid at a constant rate, the valve is interposed in a passage leading from the chamber to the bearing pocket or pockets, and the throttling effect increases as the piston moves toward the load-bearing part and decreases as the piston moves in the opposite direction. In either case, the magnitude of the supporting pressure and the manner in which it changes with piston movement depend upon the size and shape of the cooperating valving members, and both of these design features can be determined in advance by calculation. Therefore, it is a simple matter to match the force vs. travel characteristic of the supporting device to the needs of a particular installation. Moreover, it is even possible to provide a non-linear characteristic.

Sometimes it is desirable to support the mobile part by means of a pressure medium which is not very suitable for use in the control means. For example, plain water is an attractive bearing fluid, because it has good cooling properties and produces little friction, but, since it contains impurities which could cause malfunction of the throttling valve, it is not a suitable control fluid. In view of this situation, the invention provides an embodiment in which an auxiliary hydrostatic supporting element is interposed between the supporting piston and the mobile part. The bearing pocket or pockets of the auxiliary element are supplied with pressure medium from a source separate from the one which delivers fluid to the chamber of the supporting motor and the pocket or pockets of the supporting piston. With this arrangement, the mobile part may be carried by a pressure medium selected solely with regard to the bearing function, while the control means handles a medium, such as hydraulic oil, more suitable for valving purposes.

According to another embodiment of the invention, the improved supporting apparatus includes a second hydraulic control means which serves as a safety device. As long as the main hydraulic control means functions normally and maintains the supporting piston within a prescribed range of motion, the secondary control means is inactive and has no effect. However, if the supporting piston moves beyond the normal range of motion in the direction of the load-bearing part, the second control means automatically is rendered effective to control the pressure in the pressure space independently of the first control means.

BRIEF DESCRIPTION OF THE DRAWINGS

Several embodiments of the invention are described herein in detail with reference to the accompanying drawings, which contain simplified schematic illustrations, and in which.

DESCRIPTION OF ILLUSTRATED EMBODIMENTS

Figure 1:
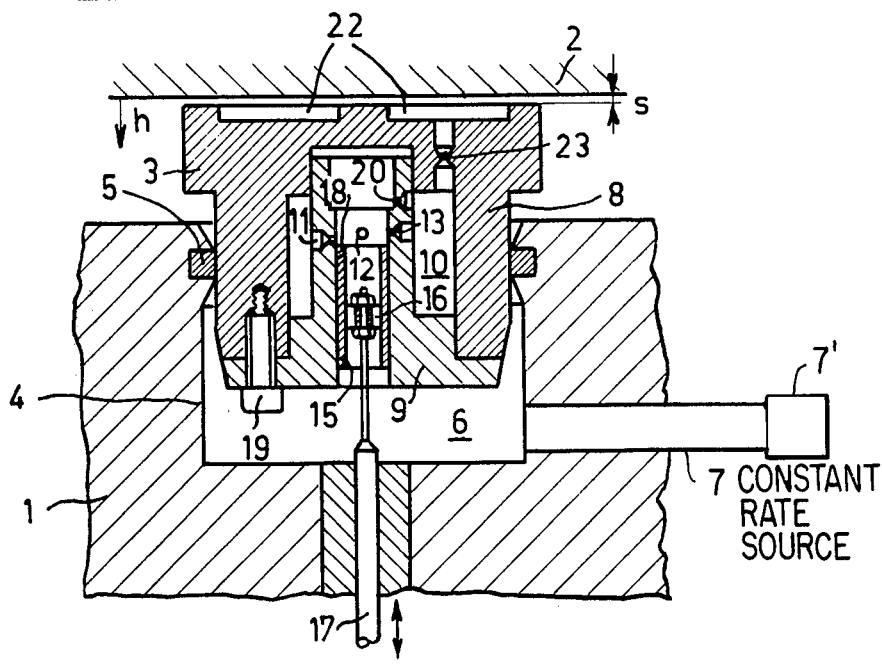
FIG. 1 is a vertical sectional view through a first version of the supporting apparatus.
Figure 2:
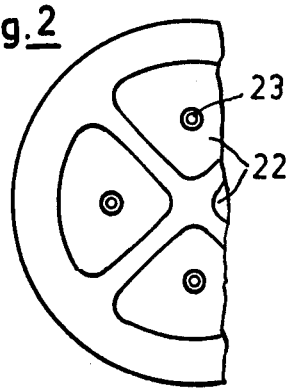
FIG. 2 is a plan view showing the bearing face of the supporting piston of FIG. 1.

As shown in FIG. 1, the first version of the invention is mounted in a load-bearing part 1 and serves to support a mobile part 2. The supporting apparatus includes a piston 3 which carries mobile part 2 on a fluid cushion and without physical contact. This cushion is formed in a very small gap s which is bounded by the parts 2 and 3, and which is shown on a greatly exaggerated scale in the drawing. Piston 3 is guided in a cylinder bore 4 having a constricted portion at its upper end which is provided with a sealing element 5. This mounting arrangement allows piston 3 to tilt slightly relatively to load-bearing part 1. The lower end of bore 4 is closed to provide a pressure chamber 6 which, by way of duct 7, communicates with a source 7' of hydraulic fluid under pressure. Source 7' delivers fluid at a constant rate, i.e., a constant volume per unit of time.

Supporting piston 3 comprises a cylindrical wall 8 whose lower end face is secured to the flange of a sleeve-shaped part 9 by means of screws 19. The sleeve portion of part 9 projects into the cavity formed by cylindrical wall 8, so that an annular space 10 is left free between the two parts. This space 10 is connected via a throttling element 23 with each of four hydrostatic bearing pockets 22 formed in the upper surface of piston 3. In its upper region, sleeve-shaped part 9 is provided with a throughflow aperture 20, by means of which annular space 10 and the bearing pockets 22 constantly communicate with pressure chamber 6. Below aperture 20, part 9 is provided with three additional throughflow apertures 11, 12, 13, which are offset from each other in both the longitudinal and the circumferential directions, and each of which has a different flow area. These additional apertures also lead from pressure chamber 6 to annular chamber 10, but they coact with a control element 15 arranged in sleeve-shaped part 9 and form a throttling valve whose flow area is modified in dependence upon the position of supporting piston 3 relative to load-bearing part 1.

Control element 15 comprises a tubular section which is connected by means of radial ribs 16 to a rod 17 which, in turn, is mounted on bearing part 1. The mounting, which is not shown in the Figure, includes an adjusting screw so that the control edge 18 at the top of sleeve 15 can be adjusted up and down relatively to throughflow apertures 11–13. Since supporting piston 3 may take up a slightly inclined position relative to part 1, the upper section of rod 17 is made thinner than the lower section so that the rod can flex.

Figure 3:
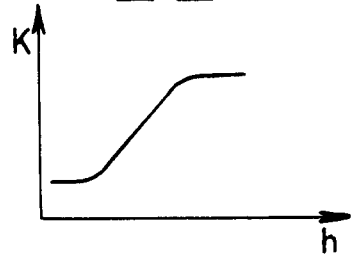
FIG. 3 is a graph showing the force-travel characteristic of the FIG. 1 embodiment.

In operation, hydraulic fluid, for example oil, is delivered to chamber 6 through duct 7 at constant rate, and passes into annular chamber 10 via those throughflow apertures 11–13 which are not then closed by control element 15, and also by way of through flow aperture 20. For annular chamber 10, the fluid flows through throttling elements 23 into bearing pockets 22, from which it escapes through bearing gap s. The throttling effect afforded by throughflow apertures 11–13 and the cooperating control element 15 produces a specific force-travel characteristic, such as the one indicated diagrammatically in FIG. 3. When the mobile part 2 moves toward load-bearing part 1, the width of gap s is reduced, and the pressure in pockets 22 rises. Therefore, supporting piston 3 is moved downward relatively to control element 15, and edge 18 of that element commences to close aperture 11. As a consequence, the pressure in chamber 6 rises, and the bearing reaction of the supporting apparatus increases. This effect is illustrated in FIG. 3 by the merger of the lower horizontal branch of the curve into the sloping curve portion. This increase in bearing reaction continues if mobile part 2 moves closer to load-bearing part 1, because then element 15 also will close apertures 12 and 13. Finally, only the throughflow aperture 20 remains open. At that time, the bearing reaction becomes constant, as indicated by the upper horizontal portion of the curve in FIG. 3. By properly selecting the flow areas and the positions in the axial direction of apertures 11–13, it is possible to obtain a predetermined, particular force-travel characteristic for each supporting apparatus.

Figure 4:
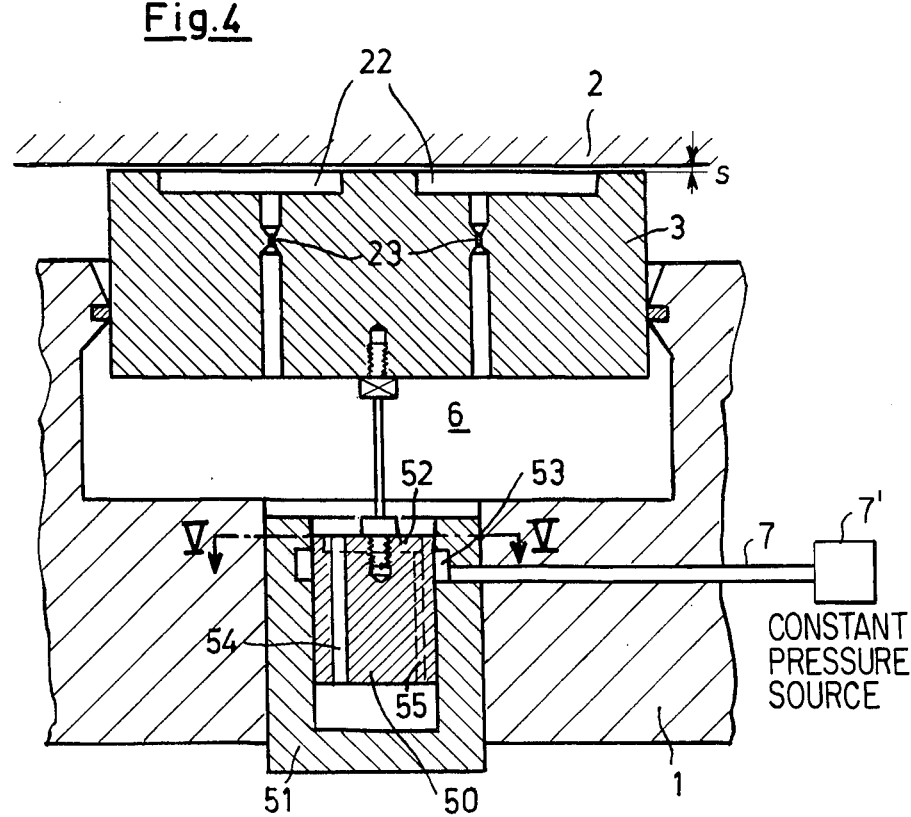
FIG. 4 is a vertical sectional view through a second embodiment.
Figure 5:
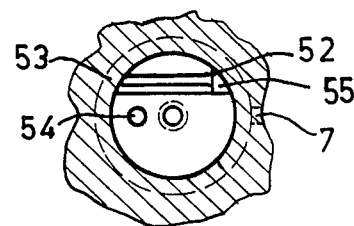
FIG. 5 is a sectional view taken on line V—V of FIG. 4.

In the embodiment illustrated in FIGS. 4 and 5, the throttle valve is interposed in the supply path leading to pressure chamber 6, rather than in a passage interconnecting this chamber and the bearing pockets. As shown in these Figures, the movable control element 50 of that valve is attached to supporting piston 3 and slides in a cylindrical insert 51 which is secured in a cylindrical bore formed in load-bearing part 1. Insert 51 contains an annular groove 53 which opens toward element 50 and is connected by duct 7 with a source 7' of hydraulic fluid at constant pressure. Control element 50 includes a throttling passage of variable cross-section in the form of a V-groove 52 which extends across the upper side of the control element and is oriented so that its cross section narrows in the downward direction. The control element also includes a through bore 54, which equalizes the pressures acting on its opposite ends, and a longitudinal groove 55, which ensures that some pressure medium always passes from annular groove 53 into pressure chamber 6.

When the supporting apparatus of FIGS. 4 and 5 is in operation, the hydraulic fluid supplied by source 7' is delivered to pressure chamber 6 via duct 7, annular groove 53 and longitudinal groove 55, then flows by way of throttling elements 23 to bearing pockets 22, and finally exits from the apparatus through the bearing gap s between supporting piston 3 and mobile part 2. If mobile part 2, under the influence of increasing load, approaches load-bearing part 1, supporting piston 3 and control element 50 also move downward. This displacement of element 50 causes a progressively increasing portion of V-shaped groove 52 to register with annular groove 53, thereby reducing the flow restriction in the supply path to chamber 6 and effecting an increase in the rate at which that chamber receives fluid. As a consequence, the pressure in chamber 6, and thus the supporting force of the supporting apparatus, increases. Here again, by suitable shaping of V-shaped groove 52, any desired force-travel characteristic can be obtained.

Figure 6:
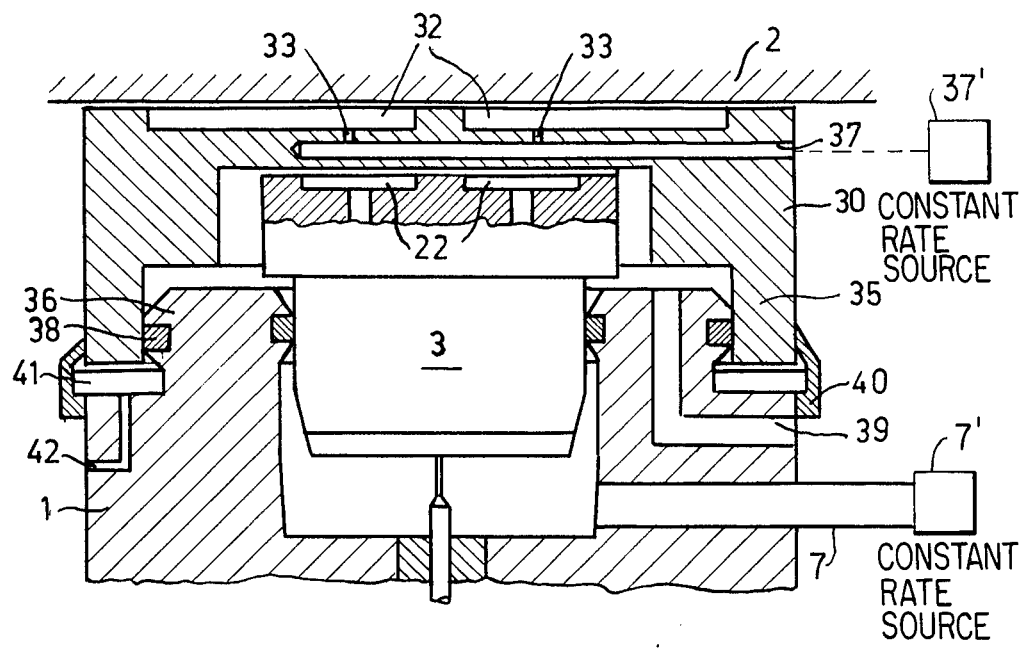
FIGS. 6 and 7 are vertical sectional views through two additional embodiments of the invention.

The third embodiment, illustrated in FIG. 6, utilizes the basic supporting apparatus of FIG. 1 in combination with an auxiliary hydrostatic supporting element 30 which is carried without physical contact by supporting piston 3, and which, in turn, bears on mobile part 2 without physical contact. Supporting element 30 comprises four bearing pockets 32, which can be of the same construction as the pockets 22 of supporting piston 3, and which are connected by way of throttling elements 33 and duct 37 to a source 37' of hydraulic fluid. This source is separate from source 7', but it too delivers fluid at a constant rate. The supporting element 30 has a lower annular section 35 with which it engages over a flange-like section 36 of load-bearing part 1. A sealing element 38, seated in the external surface of the flange-like portion 36, contacts annular section 35. The flange-like section 36 is also provided with an outlet duct 39 for return of the pressure medium used in the bearing gap between supporting piston 3 and element 30. A lip-type sealing element 40, which bears externally on annular section 35 and is secured (in a manner not shown here) to load-bearing part 1, prevents the escape of any oil which leaks between annular section 35 and sealing element 38. The space 41 enclosed by the sealing element 40 is provided with a drain conduit 42.

The supporting apparatus of FIG. 6 operates in the same way as the apparatus of FIG. 1. However, since the source 7' and 37' are separate, the pressure medium supplied by duct 7 can be one, for example oil, the best suited for control function carried out by the throttle valve, and the pressure medium supplied by duct 37 can be one, for example water, which is most suitable for the load-bearing function.

Figure 7:
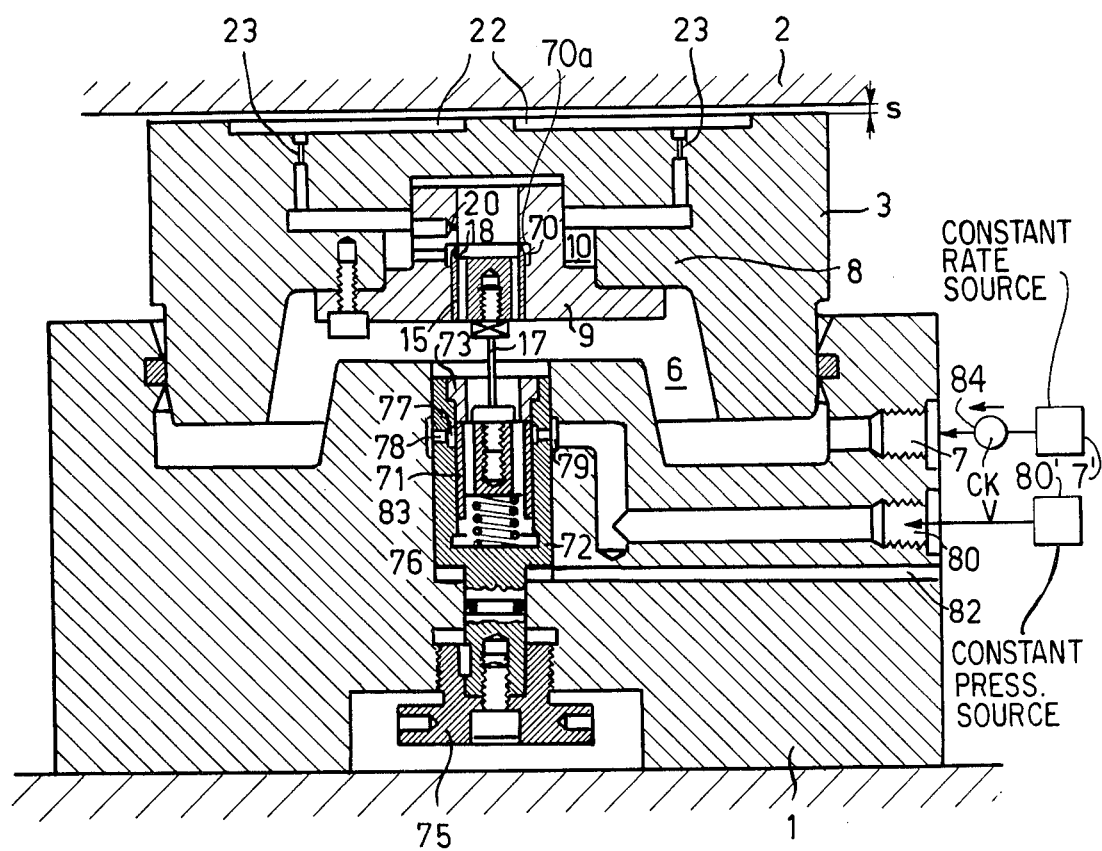

The supporting apparatus of FIG. 7 is similar to the one shown in FIG. 1, but includes secondary control means which acts as a safety device and maintains the supporting pressure in chamber 6 in the event of failure of the primary source of pressure fluid. Moreover, while, in principle, thr throttle valve of the primary control means here is the same as its FIG. 1 counterpart, the structure employed is somewhat different. In particular, it will be noted in FIG. 7 that control element 15 cooperates with an annular groove 70 in sleeve-shaped part 9. Thus, in lieu of closing or opening in succession a plurality of discrete apertures, as before, element 15 of FIG. 7 serves to vary the flow area of a single port. In addition, it will be observed that groove 70 has a shoulder 70a at its upper end which is arranged to abut edge 18 of element 15 when supporting piston 3 descends to a predetermined position relative to load-bearing part 1. The purpose of this arrangement will become evident as the description proceeds.

The secondary control means includes an additional throttling valve comprising a control element 71 which is attached to primary control element 15 by rod 17, and a cooperating sleeve element 72 which is mounted in part 1. A spring 76, reacting between parts 71 and 72, urges the control element into abutment with a ring 73 which is screwed into the upper end of element 72. The sleeve element is movable in the axial direction under the influence of an adjusting screw 75. Therefore, since the sleeve is joined to control element 15 via a yielding force-transmitting link including spring 76, ring 73, control element 71 and rod 17, screw 75 is effective to adjust the position of control edge 18 relative to annular groove 70.

Sleeve element 72 is formed with an annular groove 77 which communicates through radial bores 78 with a similarly shaped groove 79 in load-bearing part 1. Groove 79, in turn, is connected by duct 80 with a secondary source 80' of hydraulic fluid having a constant output pressure. The illustrated secondary control means is completed by a passage 82 which drains away any fluid which leaks downward between sleeve 72 and part 1, a pressure equalizing passage 83 which extends through control element 71, and a check valve 84 which is interposed in duct 7 and blocks flow from chamber 6.

Under normal conditions, control element 71 isolates annular groove 77 from chamber 6, and the primary control regulates the pressure in chamber 6 in the same way as its counterpart in FIG. 1. Thus, as supporting piston 3 moves toward and away from load-bearing part 1, control element 15 increases and decreases, respectively, the pressure in chamber 6 and thereby raises and lowers the bearing reaction of the supporting apparatus.

If primary source 7' should fail, or otherwise be prevented from delivering fluid to chamber 6, the pressure in that space will decrease, and supporting piston 3 will move beyond its normal range of motion in the direction of load-bearing part 1. This unusual displacement of supporting piston 3 brings shoulder 70a into engagement with edge 18, and thereby causes element 15 and rod 17 to shift secondary control element 71 in the downward direction relatively to sleeve 72. As a result, element 71 uncovers annular groove 77 and allows fluid supplied by source 80' to pass into chamber 6. This action raises the pressure in chamber 6 and causes check valve 84 to close. Therefore, source 7' is isolated, and source 80' and throttle valve 71, 72 now control the supporting pressure in chamber 6 in essentially the same way as the primary control means of the FIG. 4 embodiment. As long as the secondary control means is in command, the primary throttle valve 15, 70 will remain closed, and all of the fluid received by bearing pockets 22 will pass through aperture 20.

Although, in each of the illustrated embodiments, the mechanism which senses the position of piston 3 and controls supporting pressure is located internally, it will be evident that the required functions also can be performed by devices located outside piston 3.

We claim:

1. Hydrostatic supporting apparatus for supporting without physical contact a mobile part which is subject to variable loading and moves relatively to a load-bearing part, the apparatus comprising
   a. an hydraulic supporting motor including a pressure chamber formed in the load-bearing part and a supporting piston which is urged toward the mobile part by the pressure in that chamber,
   b. the supporting piston having one end which is subject to pressure in said chamber and an opposite end which obtains at least one hydrostatic bearing pocket which opens in the direction of the mobile part and serves to provide a pressure cushion which supports that part;
   c. a source of hydraulic fluid under pressure which delivers fluid at a constant rate and is connected with the pressure chamber by supply passage means;
   d. a first flow passage which is throttled and which interconnects said pocket and chamber;
   e. a second flow passage which is connected in parallel with the first flow passage; and
   f. throttle valve means having cooperating members carried, respectively, by the supporting piston and the load-bearing part and which serves to increase and decrease restriction to flow through the second flow passage as the supporting piston moves toward and away from the load-bearing part, respectively.

2. Supporting apparatus as defined in claim 1 in which
   a. one of the members of the throttle valve means includes a plurality of flow apertures which define parallel connected portions of said second flow passage; and
   b. the other member of the throttle valve means serves to close said apertures in succession as the supporting piston moves toward the load-bearing part.

3. Supporting apparatus as defined in claim 2 in which said apertures have different flow area.

4. Supporting apparatus as defined in claim 3 in which said one member is carried by the supporting piston, and said other member is carried by the load-bearing part.

5. Supporting apparatus as defined in claim 1 in which
   a. one of the members of the throttle valve means has a port which is in said second flow passage; and
   b. the other member of the throttle valve means serves to progressively close said port as the supporting piston moves toward the load-bearing part.

6. Supporting apparatus as defined in claim 5 in which said one member is carried by the supporting piston, and said other member is carried by the load-bearing part.

7. Supporting apparatus as defined in claim 1 in which one member of the throttle valve means is adjustably mounted in the component which carries it, whereby the position of the supporting piston relative to the load-bearing part at which the control valve means becomes effective to control the restriction to flow through the second flow passage may be adjusted.

8. Hydrostatic supporting apparatus for supporting without physical contact a mobile part which is subject to variable loading and moves relatively to a load-bearing part, the apparatus comprising
   a. an hydraulic supporting motor including a pressure chamber formed in the load-bearing part and a supporting piston which is urged toward the mobile part by the pressure in that chamber,
   b. the supporting piston having one end which is subject to pressure in said chamber and an opposite end which contains at least one hydrostatic bearing pocket which opens in the direction of the mobile part and serves to provide a pressure cushion which supports that part;
   c. a source of hydraulic fluid which delivers fluid at a constant pressure;
   d. supply passage means having two parallel portions and connecting the source with the pressure chamber;
   e. throttled passage means interconnecting said pocket and chamber; and
   f. throttle valve means having cooperating members carried, respectively, by the supporting piston and the load-bearing part and which serves to decrease and increase restriction to flow through one of said portions of the supply passage means as the supporting piston moves toward and away from the load-bearing part, respectively,
   g. the other of said portions of the supply passage means being continuously open and serving to deliver a limited rate of flow to the chamber regardless of the relative position of the members of the throttle valve means.

9. Supporting apparatus as defined in claim 8 in which one member of the throttling valve means contains a portion of the supply passage means in the form of a groove of V-shape in cross section; and the other member of the valve means has a port which is in an adjacent portion of the supply passage means and with which the V-shaped groove progressively registers as the supporting piston moves toward the load-bearing part.

10. Hydrostatic supporting apparatus for supporting without physical contact a mobile part which is subject to variable loading and moves relatively to a load-bearing part, the apparatus comprising
    a. an hydraulic supporting motor including a pressure chamber formed in the load-bearing part and a supporting piston which is urged toward the mobile part by the pressure in that chamber,
    b. the supporting piston having one end which is subject to pressure in said chamber and an opposite end which contains at least one hydrostatic bearing pocket which opens in the direction of the mobile part and serves to provide a pressure cushion which supports that part;
    c. a source of hydraulic fluid under pressure connected with said chamber by supply passage means and which delivers fluid to that chamber with flow rate and pressure characteristics which are independent of variations in the loading on the mobile part and one of which characteristics is constant;
    d. throttled passage means interconnecting said pocket and chamber;
    e. throttle valve means located in a selected one of said passage means determined by which of said characteristics is constant and being operated by the supporting piston to vary in reverse senses restriction to flow through the associated passage means as that piston moves in opposite directions,
    f. the relationship between the direction of movement of the piston and the sense of the variation in flow restriction afforded by the throttle valve means being correlated with the selection of the passage means in which the throttle valve means is located so that the pressure in said chamber increases and decreases, respectively, as the supporting piston moves toward and away from the load-bearing part;
    g. an auxiliary supporting element which is interposed between the supporting piston and the mobile part and is carried by the pressure cushion of the supporting piston;
    h. at least one hydrostatic bearing pocket in the auxiliary supporting element which opens toward the mobile part and provides a pressure cushion which directly supports that part; and
    i. a second, separate source connected to deliver hydraulic fluid under pressure to the pocket of the auxiliary supporting element.

11. Supporting apparatus as defined in claim 10 in which the second source of hydraulic fluid under pressure delivers fluid at a constant rate.

12. Hydrostatic supporting apparatus for supporting without physical contact a mobile part which is subject to variable loading and moves relatively to a load-bearing part, the apparatus comprising
    a. an hydraulic supporting motor including a pressure chamber formed in the load-bearing part and a supporting piston which is urged toward the mobile part by the pressure in that chamber,
    b. the supporting piston having one end which is subject to pressure in said chamber and an opposite end which contains at least one hydrostatic bearing pocket which opens in the direction of the mobile part and serves to provide a pressure cushion which supports that part;
    c. a source of hydraulic fluid under pressure connected with said chamber by supply passage means and which delivers fluid to that chamber with flow rate and pressure characteristics which are independent of variations in the loading on the mobile part and one of which characteristics is constant;
    d. throttled passage means interconnecting said pocket and chamber;

e. throttle valve means located in a selected one of said passage means determined by which of said characteristics is constant and being operated by the supporting piston to vary in reverse senses restriction to flow through the associated passage means as that piston moves in opposite directions, f. the relationship between the direction of movement of the piston and the sense of the variation in flow restriction afforded by the throttle valve means being correlated with the selection of the passage means in which the throttle valve means is located so that the pressure in said chamber increases and decreases, respectively, as the supporting piston moves toward and away from the load-bearing part, whereby the supporting piston normally is maintained within a range of movement; and g. hydraulic control means which is rendered effective by movement of the supporting piston beyond said range in the direction of the load-bearing part to maintain supporting pressure in the pressure chamber independently of the throttle valve means.

13. Supporting apparatus as defined in claim 12 in which the hydraulic control means includes a. a second, separate source of hydraulic fluid under pressure which delivers fluid at a constant pressure;

b. a second supply passage means connecting the second source with the pressure chamber;

c. second throttle valve means interposed in the second supply passage means and having cooperating parts carried, respectively, by the supporting piston and the load-bearing part, the second throttle valve means serving to close the second supply passage means when the supporting piston is within said range of movement and to progressively open that passage means as the supporting piston moves beyond that range toward the load-bearing part; and d. a check valve in the first supply passage means which blocks flow from the pressure chamber toward the first source.

* * * * *